Nov. 27, 1956 M. G. HOLLABAUGH ET AL 2,772,135
METHOD AND APPARATUS FOR MAGNETICALLY
RECORDING VIDEO-FREQUENCY SIGNALS
Filed Aug. 15, 1952 2 Sheets-Sheet 1

INVENTORS
MAX G. HOLLABAUGH
FRED D. SHER
KENNETH R. WISNER
Henry L. Shenier
ATTORNEY INVENTORS
MAX G. HOLLABAUGH
FRED D. SHER
KENNETH R. WISNER
BY Henry L. Shenier
ATTORNEY 2,772,135

METHOD AND APPARATUS FOR MAGNETICALLY RECORDING VIDEO-FREQUENCY SIGNALS

Max G. Hollabaugh, Jackson Heights, and Fred D. Sher and Kenneth R. Wisner, New York, N. Y., assignors, by mesne assignments, to ACF Industries, Incorporated, a corporation of New Jersey Application August 15, 1952, Serial No. 304,614

5 Claims. (Cl. 346—74)

Our invention relates to a method and apparatus for magnetically recording video-frequency signals, and more particularly to a method and apparatus for recording and reproducing high frequencies, wide bands of frequencies or any signal which can be represented by a function of time containing frequencies in the video range.

Magnetic recording is widely used for recording frequencies in the audible range. As practiced by the known art the recording medium is moved past the recording and reproducing heads at the slowest speed which will ensure the desired high frequency response. In practice, these speeds range from a few inches to several feet per second. In order to obtain a frequency range of from 15 kilocycles to 100 kilocycles, recording speeds between ten inches and sixty inches per second are employed, depending on the properties of the recording medium and the method of recording. Recording mediums are known to the art and may be any carrying surface upon which is deposited by electroplating or otherwise magnetic alloys or finely divided magnetic powder, or may be made of wire comprising the magnetized material itself. A typical magnetic alloy suitable in magnetic recorders contains about 38% iron, 52% cobalt and 10% vanadium. Powdered material, such as black magnetic iron oxide, may likewise be employed. The magnetic material may be deposited upon disks, drums or tapes made of any suitable material such as paper, plastic, brass or the like.

The prior art has recorded and reproduced magnetically recorded signals approaching 200 kilocycles. In the tape or wire recorders of the prior art compliance of the record member is employed to maintain the necessary highly uniform contact between the recording head and the recording medium. This uniformity of contact is very important. If the space between the head and the medium varies by as little as .0001 inch, considerable variations in output level will occur. These variations will render the recorder essentially useless for many video recording purposes or for employment in analog computer recording. By video frequencies we mean frequencies up to 100 megacycles. Contact between the recording head and the recording medium is essential in order to maintain good constancy of output. Good contact, furthermore, produces the best possible packing factor or resolution in the recording medium. This contact between the recording head and the recording medium produces wear and this wear determines the limit of the useful life of the recording surface. In practice with present recording heads and recording mediums the life of a recording surface is about one-half a million plays or passes over a particular particle of the head. In tape machines packing factors of from 1,000 to 2,000 cycles per inch are commonly attained with speeds between five inches and sixty inches per second.

In order to record wider band widths or higher frequencies much higher speeds are necessary. For the video range, for example, if we are to record 500 to 1,000 cycles to the inch of recording medium, we will have to employ linear speeds between 500 inches per second and 10,000 inches per second. Speeds of this nature, further, would have to be employed in the case of a magnetic recorder drum memory for a digital computer, for recording radar signals or television signals. At these speeds contact heads cannot be employed because the wear would destroy the recording medium or the recording head or both in a few minutes since the limitation of a half million plays or passes would be reached within this time.

It has been attempted to record very high frequencies by an arrangement in which the recording head was spaced from the recording medium by an air gap. The introduction of an air gap produced two undesirable effects. First, the resolution or packing factor was reduced by an inordinate degree. Secondly, it was found impossible to hold the air gap accurately even with the best machining practice. In a drum recorder, for example, a variation in the amplitude of the output as a function of the rotation was produced. The net result was that all recorded signals were modulated by a wave containing the drum revolution frequency and its harmonics.

One object of our invention is to provide a method and apparatus for magnetically recording video-frequency signals having packing factors of the same magnitude as those found in audio-recording practice.

Another object of our invention is to provide a method and apparatus for magnetically recording video-frequency signals on a moving medium producing a constant output independent of the medium motion.

Another object of our invention is to provide a magnetic recorder which enables us to record video-frequency signals magnetically at useful output constancy.

Another object of our invention is to provide a high frequency, wide band magnetic recorder.

A further object of our invention is to provide a magnetic recorder in which the recording head will follow the surface of the recording medium at a sufficiently close distance to permit high packing factors and at a constant distance from the recording medium to preclude modulation by variation of the air gap between the recording head and the recording medium.

Another object of our invention is to provide a magnetic recorder in which the wear of the recording medium is reduced to a negligible quantity.

Still another object of our invention is to provide a novel recording head of such low mass and of such compliance in suspension as to permit the recording head to follow variations in the surface of the recording medium.

A further object of our invention is to provide a method in which a fluid bearing is produced between the recording head and the recording surface.

Other and further objects of our invention will appear from the following description.

In the accompanying drawings which form part of the instant specification and which are to be read in conjunction therewith and in which like reference numerals are used to indicate like parts in the various views.

In general our invention contemplates the provision of a recording head of very low mass and inertia and the mounting of this head in a highly compliant manner. Our head is so constructed and arranged that a fluid bearing film of air of good self-maintaining characteristics is produced in the interface region between the head and the recording medium. This results in separating the recording head from the record member by a very small distance, typically .0001 of an inch. The air film which is formed and maintained by the low inertia and compliantly mounted recorder is analogous to that formed and maintained in the Kingsbury thrust bearing. It is a unique characteristic of our recorder that the head is compliant rather than the record member.

Figure 7:
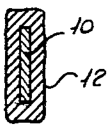
Figure 7 is a fragmentary sectional view showing one step in the manufacture of our recording head.
Figure 9:
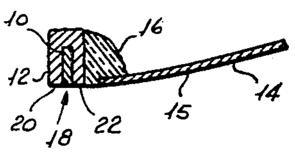
Figure 9 is a view similar to Figure 7 showing a third step in the manufacture of our recording head.

Referring now to Figure 7, a ribbon 10 of highly conductive material such as silver or copper, whose thickness is determined by the desired width of the recording or reproducing gap, usually .0005 of an inch, and whose width is between .01 and .03 of an inch, is stretched and held taut in a suitable jig. While so held in the jig the ribbon is coated with a ferromagnetic material 12, as, for example, electrolytic nickel or the like, for a portion of its length equal to the desired recording track width and to a thickness of between .001 and .003 of an inch. The coating may be by any suitable process, as, for example, by electroplating, electro-deposition, or the like.

Figure 5:
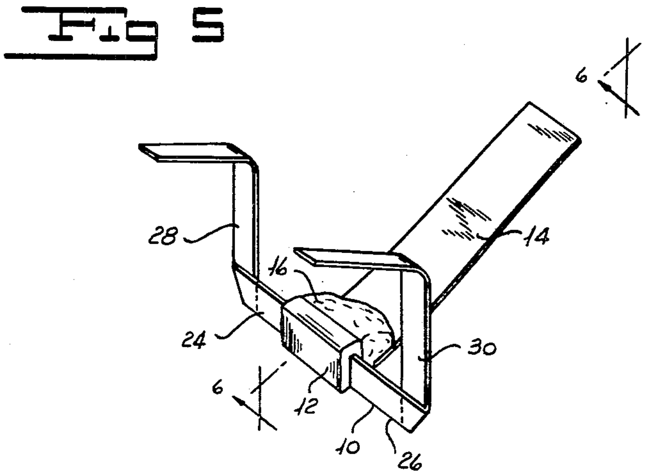
Figure 5 is a perspective view showing a portion of our recording head drawn on an enlarged scale.
Figure 6:
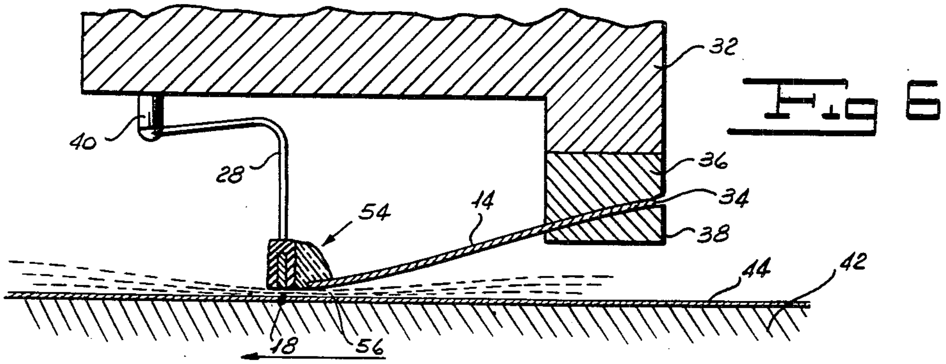
Figure 6 is a sectional view taken along the line 6—6 of Figure 5 showing our recording head mounted in a suitable carrier.
Figure 8:
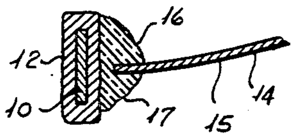
Figure 8 is a view similar to Figure 7 showing another step in the manufacture of our recording head.

Referring now to Figure 8, a flexible support vane 14 made of any suitable material such as beryllium copper, spring steel, synthetic resin or the like, is attached to one side of the coating 12 by means of a dielectric adhesive 16. The adhesive may be a thermoplastic, synthetic resin or may comprise plastic in a suitable solvent. A section of the parts after this operation is completed is shown in Figure 8. It will be observed that a portion 17 of the securing medium and a portion of the ribbon 10 and the coating 12 extends below the lower surface 15 of the support vane 14. All of the material of the securing compound 17, the ribbon 10 and the coating 12 which extends below the lower surface 15 of the support vane 14 is ground off and then polished until a mirrorlike surface 18 formed in part by the coating 12, the ribbon 10 and the securing medium 16 is formed coplanar with the lower surface 15 of the support vane 14. It will be observed that the coating 12 now forms a U-shaped magnetic structure about the ribbon conductor. The nonmagnetic material of the ribbon between the open ends 20 and 22 of the U-shaped magnetic material constitutes the recording or reproducing gap. The uncoated portions 24 and 26 on each side of the coated portion are then bent upwardly to form terminal leads 28 and 30 of our head, as can readily be seen by reference to Figure 5.

Any suitable positioning device 32 is used to mount the head structure thus formed. The outer end 34 of the vane 14 is clamped between member 36 and member 38 carried by the positioning device 32. This device also carries contact members 40 to which the terminal members 28 and 30 are attached.

The positioning device is vertically adjustable by any suitable means (not shown) by which the polished surface 18 may be brought into contact with the magnetic recording medium 44 mounted upon a support 42. The support 42 may be a drum, a disk or a tape. It is to be remembered that a feature of our invention is that the recording medium is noncompliant while the recording head is the compliant member. Accordingly, if a tape is used it is supported. By reference to Figure 2 it will be seen that the tape recording medium 48 is stored upon a reel 46 and is adapted to be led over a positioning pulley or drum 50 mounted upon a suitable shaft and fed to a reel 52. The recording head indicated generally by the reference numeral 54 is mounted tangent to the drum 50.

The positioning device 32 is lowered until the recording head indicated generally by the reference numeral 54 is brought into light contact with the stationary surface of the record medium 34. As the record medium begins to move a film of air 56 will begin to form between the polished surface of the head 18 and the surface of the record medium 44.

Figures 1, 2, 3, 4:
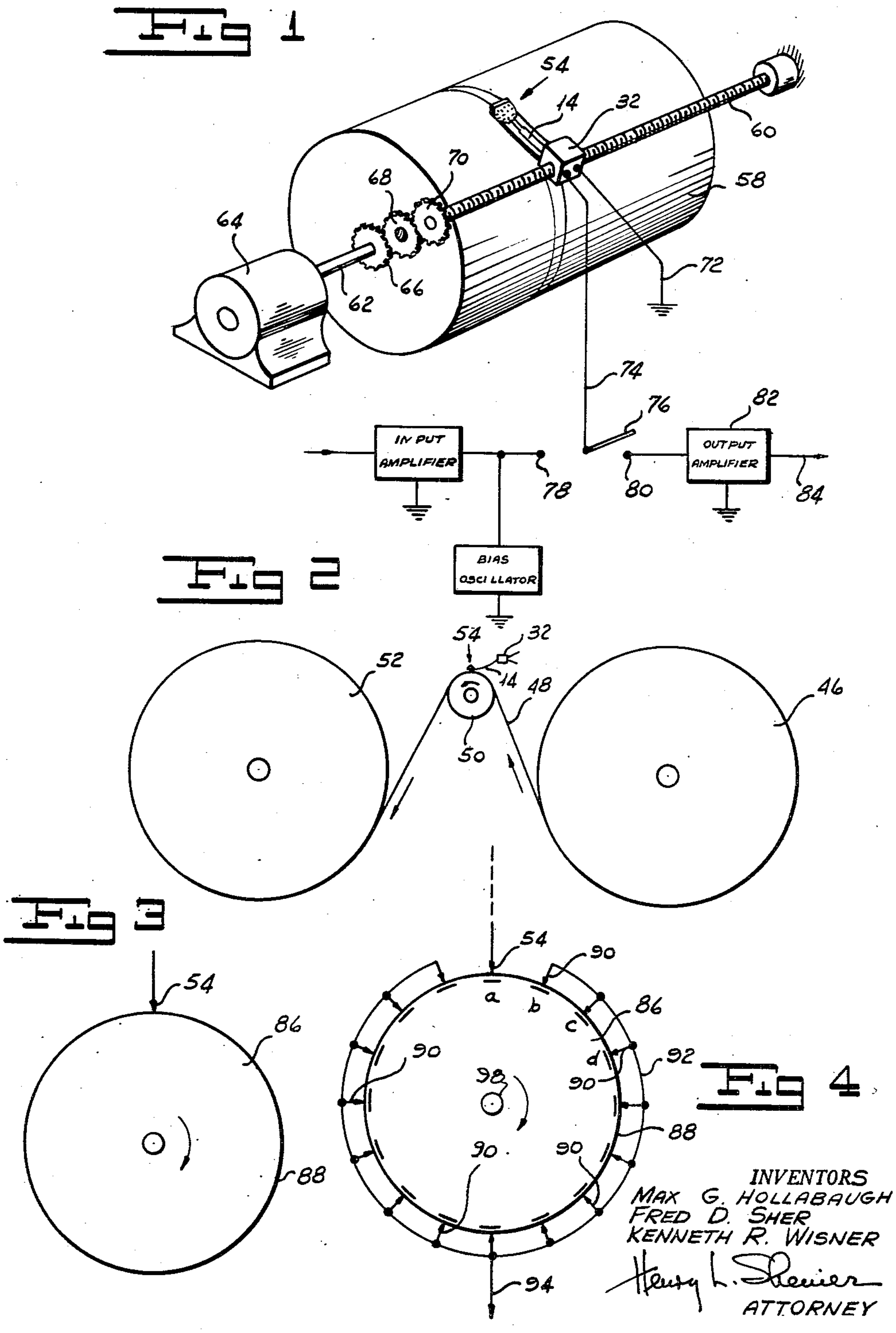
Figure 1 is a diagrammatic perspective view of a magnetic recorder showing one embodiment of our invention in which a rotary drum is employed with our recording head.
Figure 2 is a diagrammatic view showing another embodiment of our invention in which a magnetic tape is employed with our recording head.
Figure 3 is a diagrammatic view showing the arrangement used for recording a radar signal.
Figure 4 is a diagrammatic view showing an arrangement for summing a plurality of radar sweeps.

In order to prove the existence of the fluid bearing film, we placed our head adjacent a conducting drum such as the drum 58 shown in Figure 1. We connected the terminal 40 and the drum in series across a voltage source and an amplifier the output of which was connected to a cathode-ray oscilloscope. When the drum started to revolve a "hash" was observed on the oscilloscope. Almost immediately the hash disappeared and only an occasional pulse indicating a contact between the head and the drum was observed. At very low speeds of about one inch per second no pulses were observed and a steady line appeared on the oscilloscope, proving that no contact existed between the head and the drum. At the low speed of one inch a second a very light pressure of the support vane 14 was employed. This proved that a fluid bearing film of air had been formed and was being maintained between the head and the record surface. We ran one of our heads with a coated record drum in which the record moved at a velocity of 4,000 inches per second continuously for fifty hours and could detect no wear on either the record or the polished head surface. In a contact head the record would have been destroyed in a few minutes at this velocity. The vane pressure is of course increased for the higher velocities in order to prevent building up a film of air which is too thick.

The thickness of the air film may be adjusted by a change in head pressure by means of the positioning device. The thickness, width and the material of the ribbon 10, as well as the thickness and material of the coating 12 may be varied to achieve advantageous results depending upon the type of service desired. One type of head may be employed for reproduction and another for recording. Similarly, a different type of head can be used in recording pulses than in recording analogs. Furthermore, the dimensions of the head may be advantageously varied in accordance with various frequency ranges to be dealt with.

The weight of the head and the material and length and width and thickness of the support vane 14 are chosen to maintain the head in stable relationship to the record surface. The resonant frequency of the assembly should be above the frequency of vibrations produced by irregularities in the record surface. Advantageously, we may suppress vibrations in the support vane 14 by suitable damping material. It is to be understood in general that it is desirable to keep the mass of the bonding material 16 to a minimum in accordance with our principle of reducing the effective mass of the head to a minimum. This permits the head to follow the small hills and valleys in the record surface. We have found that keeping the amount of conductive material in the immediate vicinity of the head to a minimum is desirable.

In practice the positioning member 32 is brought into light contact with the record member and the record member brought up to speed. The positioning member may then be lowered by a micrometer screw adjustment (not shown) until the air gap is brought to a minimum with sufficient factor of safety to prevent the disruption of the air bearing effect at the speeds to be employed.

Referring now to Figure 1, we have shown our head in an assembly suitable for recording and reproducing video signals for television. It is understood, of course, that the high speeds involved limit the program produced to a comparatively short one, such as a spot announcement or the like. The drum 58 is coated with the record medium. The positioning device 32 is mounted upon a lead scrw 60. The drum 58 is mounted on a shaft 62 driven by a motor 64. The motor drives the lead screw through gear 66 secured to the shaft 62, idler gear 68 and gear 70 which is carried by the lead screw 60. The head 54 is carried by the support vane 14 which is carried by the positioning device 32. One terminal 40 is grounded by conductor 72. The other terminal 40 is connected to conductor 74 which terminates in a switch arm 76. The switch arm is adapted to be connected to terminal 78 when the record is being made. The terminal 78 is the output of the recording signal. When reproducing the magnetically recorded signal the switch arm 76 is adapted to be connected to terminal 80 which leads to the playback amplifier 82, the output signal being removed through channel 84. Kinescope or moving picture reproductions on television are blurry and unsatisfactory as compared with "live" material. Our method of recording television signals and reproducing them gives a clarity of reproduction substantially equal to the actual subject being reproduced. By the use of drums of large diameter and sufficient length it would be possible to reproduce television programs for longer periods of time. There is no limitation on the speed of the relative motion between the record member and our head due to the interposition of the air bearing, thus eliminating the wear which would otherwise take place.

For recording a test pattern, a disk 86 having a coated surface 88 in combination with our recording head 54 may be employed in which the test pattern is continuously reproduced.

The embodiment in Figure 3 may be conveniently employed as a memory for digital computers. One application of our invention for the recording of weak radar signals is shown in Figure 4. The disk 86 is provided with a coated surface 88 and mounted for rotation with a shaft 98 suitably driven. A recording head 54 is mounted at one position on the surface of the record. A plurality of playback heads indicated diagrammatically by the reference numerals 90 are mounted around the periphery of the disk and connected in parallel by a channel 92 leading to the output channel 94. In operation a signal is recorded at *a*. This signal will be read by the first reproducing head 90 at *b*. In the meantime, a second signal will be recorded at point *a*. This signal will be read at point *b* simultaneously with the reading of the first signal at point *c* at the second reproducing head. Meanwhile, the third signal will be recorded. Then the first signal will be read at *d*, the second signal will be read at *c* and the third signal will be read at *b*, all simultaneously. It will be seen that the arrangement in Figure 4 is such that the successive radar signals will be summed or integrated continuously. The resolution of targets by a radar system is limited by the noise level of the amplifier. At long range a small target is substantially indistinguishable from noise. Since the noise is random it sometimes adds to the target return and sometimes deducts. By the summation of a large number of returns the sum of all the noise power will tend to approach a fixed value which is proportional to the average noise power. The target returns will also tend to approach a fixed value which is proportional to the average power reflected from a target. By means of the arrangement shown in Figure 4 a number of returns from a target are integrated so that the fluctuations in noise will be decreased and the coincidence of the target returns will enable us to distinguish the target with ease.

It will be seen that we have accomplished the objects of our invention. We have provided a method and apparatus for magnetically recording video-frequency signals having packing factors of the same magnitude as those felt in audio-recording practice. We have provided a method and apparatus for magnetically recording video-frequency signals on a moving medium which will produce a constant output independent of the medium motion whereby we are enabled to record video-frequency signals magnetically at a useful output constancy. We have provided a high frequency, wide band magnetic recorder in which the recording head will follow the surface of the recording medium at a sufficiently close distance to permit high packing factors while maintaining this distance constant to preclude modulation by variation of the air gap between the recording head and the recording medium. We have provided a novel recording head of such low mass and of such compliance that a fluid bearing is produced between the recording head and the recording surface which will substantially preclude wear of either the head or the record even though high relative speeds of motion between these are employed.

We have described our invention with a fluid bearing with air as the fluid. It is to be understood that any other fluid may be employed. If desired, the drum shown in Figure 1 may be immersed in a nonconducting liquid such as a light hydrocarbon oil, carbon tetrachloride, or the like. With a more viscous fluid the fluid bearing between the head and the record surface may be established and maintained at very low speeds due to capillary action and even when no relative movement between the recording head and the record surface takes place, that is, when one is stationary with respect to the other. With low relative movements our invention would be useful for very low frequency signals.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A recording head including in combination a ribbon of highly conductive material, a core of ferromagnetic material of U-shaped cross section surrounding two opposed sides and one edge of the ribbon intermediate its ends so that only the other edge of the ribbon is exposed, and an elongated compliant member in the form of a leaf spring one end of which is attached to the core adjacent the exposed ribbon edge so that the head is supported by the member, the exposed edge of the ribbon, the adjacent ends of the core and the planar portion of the spring contiguous the attached end thereof forming an uninterrupted surface for positioning the head with respect to the recording medium.

2. A recording head according to claim 1 wherein the core is integrally formed.

3. A recording head according to claim 2 wherein the core is formed of an electrolytically deposed material.

4. A recording head according to claim 1 wherein the end of the elongated compliant member is attached to the core by an adhesive material.

5. A recording head according to claim 4 wherein the adhesive material forms a portion of the uninterrupted surface.

References Cited in the file of this patent

UNITED STATES PATENTS

| | | |
|---|---|---|
| 2,351,006 | Camras | June 13, 1944 |
| 2,536,272 | Friend | Jan. 2, 1951 |
| 2,540,711 | Camras | Feb. 6, 1951 |
| 2,612,681 | Camras | Oct. 7, 1952 |
| 2,617,705 | Coombs et al. | Nov. 11, 1952 |
| 2,618,710 | Camras | Nov. 18, 1952 |